(12) United States Patent
Kullander

(10) Patent No.: US 9,957,803 B2
(45) Date of Patent: May 1, 2018

(54) END SUPPORTED HELICAL TURBINE

(71) Applicant: GOX AB, Hamburgsund (SE)

(72) Inventor: Sten Thomas Kullander, Hamburgsund (SE)

(73) Assignee: GOX AB, Hamburgsund (SE)

( * ) Notice: Subject to any disclaimer, the term of this patent is extended or adjusted under 35 U.S.C. 154(b) by 279 days.

(21) Appl. No.: 14/907,527

(22) PCT Filed: Jul. 21, 2014

(86) PCT No.: PCT/SE2014/000101
§ 371 (c)(1),
(2) Date: Jan. 25, 2016

(87) PCT Pub. No.: WO2015/012752
PCT Pub. Date: Jan. 29, 2015

(65) Prior Publication Data
US 2016/0160650 A1 Jun. 9, 2016

(30) Foreign Application Priority Data
Jul. 23, 2013 (SE) ...................... 1330093

(51) Int. Cl.
*F03D 3/06* (2006.01)
*F01D 5/14* (2006.01)
(Continued)

(52) U.S. Cl.
CPC ............ *F01D 5/141* (2013.01); *F03B 13/183* (2013.01); *F03B 13/264* (2013.01);
(Continued)

(58) Field of Classification Search
CPC .... F03B 13/183; F03B 13/264; F03B 17/065; F03D 3/061; F03D 3/062; F03D 3/065
See application file for complete search history.

(56) References Cited

U.S. PATENT DOCUMENTS 1,851,680 A 3/1932 Morris
7,741,729 B2 * 6/2010 Lyatkher ............... F03B 13/264
290/44

(Continued)

FOREIGN PATENT DOCUMENTS

DE  202008005724 U1  9/2008
EP     2028102 A1    2/2009
(Continued)

OTHER PUBLICATIONS

Extended European Search Report dated Jul. 19, 2017 in corresponding EP Application No. 14829963.9.

*Primary Examiner* — Justine Seabe
(74) *Attorney, Agent, or Firm* — Knobbe, Martens, Olson & Bear, LLP

(57) ABSTRACT

The claimed invention relates to a turbine adapted to extract energy from the velocity of a streaming fluid such as wind, steam, tidal streams and water waves. The invented turbine is arranged with its axis of turbine rotation directed at substantially right angles to the current direction of the streaming fluid and comprising a kind of self-supported blade body which is rotationally symmetric and constructed by rotor blades integrated transversely and supported two by two, allowing the fluid to flow through the turbine with less turbulence compared to other types of turbines equipped with separate rotor blades.

14 Claims, 9 Drawing Sheets

(51) Int. Cl.
 *F03B 13/18* (2006.01)
 *F03B 13/26* (2006.01)
 *F03B 17/06* (2006.01)

(52) U.S. Cl.
 CPC ............ *F03B 17/065* (2013.01); *F03D 3/061* (2013.01); *F03D 3/065* (2013.01); *F05B 2250/25* (2013.01); *Y02E 10/28* (2013.01); *Y02E 10/38* (2013.01); *Y02E 10/74* (2013.01)

(56) References Cited

U.S. PATENT DOCUMENTS

| | | | | |
|---|---|---|---|---|
| 8,061,993 | B2* | 11/2011 | Sassow | .................. F03D 3/061 416/176 |
| 2010/0090466 | A1 | 4/2010 | Lyatkher | |
| 2011/0027084 | A1 | 2/2011 | Rekret | |
| 2012/0128500 | A1 | 5/2012 | Perless | |
| 2015/0037153 | A1* | 2/2015 | Kittel | ....................... F03B 3/12 416/175 |

FOREIGN PATENT DOCUMENTS

| | | | |
|---|---|---|---|
| FR | 2424470 | A1 | 11/1979 |
| JP | S63-57874 | A | 3/1988 |
| SU | 1150395 | A1 | 4/1985 |
| WO | 01/48374 | A2 | 7/2001 |
| WO | 2008/066313 | A1 | 6/2008 |

\* cited by examiner

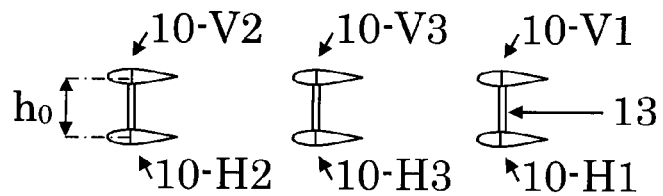
$a-a$
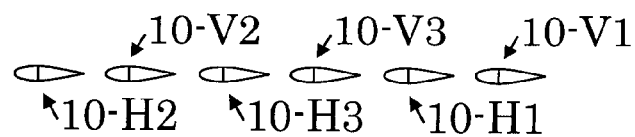
$b-b$
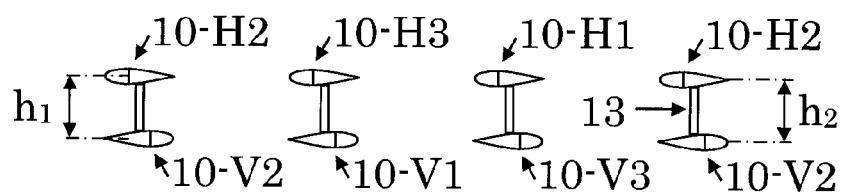
$c-c$
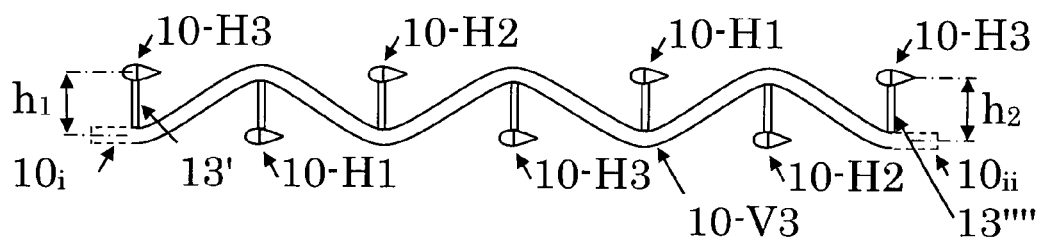
$d-d$
Fig. 5

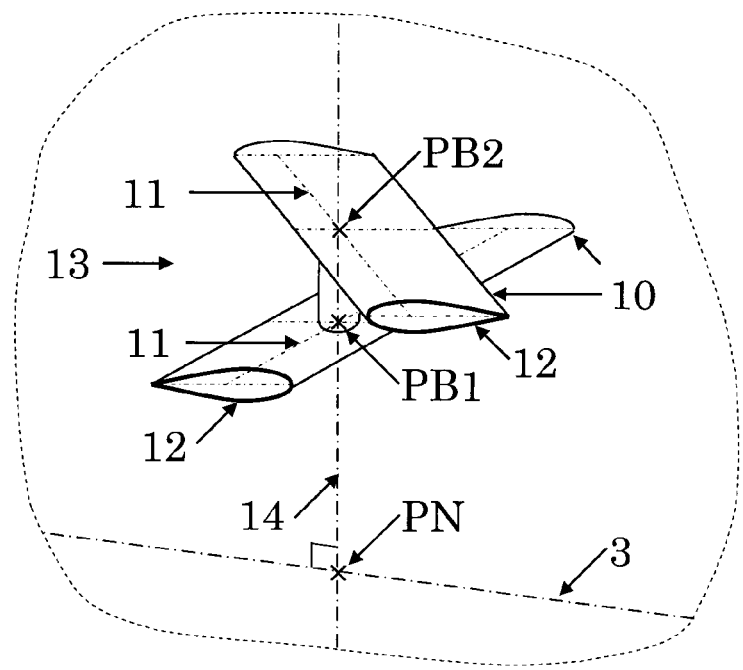
*Fig. 6*
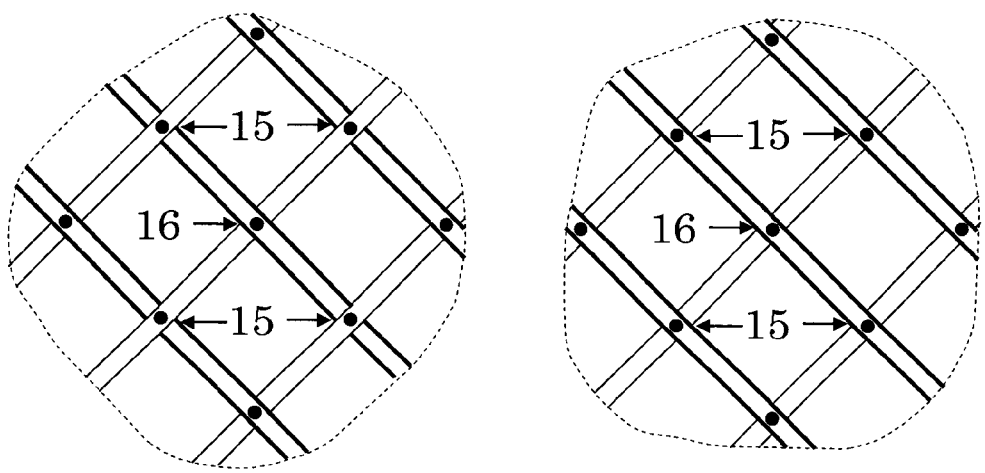
*Fig. 7*     *Fig. 8* e − e    f − f

END SUPPORTED HELICAL TURBINE

CROSS-REFERENCE TO RELATED APPLICATIONS

This application is the U.S. National Phase under 35. U.S.C. § 371 of International Application PCT/SE2014/000101, filed Jul. 21, 2014, which claims priority to Swedish Patent Application No. 1330093-4, filed Jul. 23, 2013. The disclosures of the above-described applications are hereby incorporated by reference in their entirety.

TECHNICAL FIELD OF THE INVENTION

The claimed invention relates in a first aspect to a turbine adapted to extract energy from a streaming fluid by rotation of a rotor around an axis of turbine rotation that is oriented substantially at right angles to the current fluid direction, that is a transverse orientation; wherein the rotor is provided with rotor blades of helical design extending from one rotor end to the other and mounted to the turbine in at least one of said ends.

The invention relates in a second aspect to the use of the turbine in a power generation plant, which is either floating or firmly attached to the ground; and adapted to transform the extracted energy into electrical or mechanical or visual effect, or into a combination of two or three of said effects.

BACKGROUND OF THE INVENTION

Turbines arranged to extract energy from a streaming fluid—such as wind, steam, tidal streams and water waves—are usually optimized to reach maximum efficiency at a certain fluid speed, that is designed for a certain operating point. Basically, turbine designs assume a fluid velocity is present to give a lifting force on the rotor blades and so overcome the total drag and friction forces of the rotor and turbine in operation. Thereby, the turbine axis will rotate due to the moment produced by the lifting force that corresponds to the product of the second order pressure gradient of the fluid passing over the wing profile of the rotor blades times the distance to the axis of turbine rotation. This applies for conventional wind turbines, steam turbines and tidal turbines having an axis of rotation parallel to the fluid, that is a horizontal orientation; and for unconventional transversal turbines having an axis of rotation at right angles to the fluid, for example vertical axis of type H-rotor SE564997C2 or horizontal axis of type US2011/110779A1.

Transversal turbines are known to exhibit an axis of turbine rotation and a rotor which revolves around said axis, and four significant fluid passages through the rotor: windward, downstream, leeward and upstream. The result is a lifting force vector on the rotor blades that pulsates during each complete turn of the rotor, so the absolute value of the pulse fluctuates by the cosine; to show maximum values to the windward and leeward and minimum values downstream and upstream. The rotation of the rotor is known to be transferred to the turbine by one or more joints, each one of which is exhibiting an attachment point shared with a rotor blade. Thus, the rotor and rotor blades may be joined to the turbine in several attachment points. In the said H-rotor design, the rotor is mounted to the turbine in two attachment points located symmetrically around the mid-normal plane of the rotor, that is centre supported; while the Darreus wind turbine NL19181 has a rotor supported in both ends by the turbine, that is double-end supported. Also known is a rotor supported in one end only, that is single-end supported; that is provided with straight rotor blades having an oblique axis of turbine rotation and joined to a central hub at the ground level. It is further known that centre supported turbines are provided with a supporting framework of supporting arms, hub and turbine axis; all of which are disturbing the flow pattern when the fluid passes through the blade body of the rotor, so the lifting force decreases on the rotor blades; particularly to leeward, which reduces the turbine efficiency. This disadvantageous effect of transversal turbines reduces the efficiency, as compared to conventional turbines having a horizontal axis of turbine rotation and the same solidity; that is the ratio of the rotor blade tip velocity over fluid velocity is decreased. For this reason, investments in wind power plants prefer turbines of a horizontal axis compared to transversal. Thus, as it may be realized, there is a need for a rotor that is not centre supported in order to increase the efficiency of transversal turbines.

Transversal turbines are known to equip preferably three straight rotor blades, for example the H-rotor design having blades extending parallel to the axis of turbine rotation. It is further known that a centrifugal force arises due to the rotation, acting on the turbine mass and directed outwards at a right angle to the axis of rotation. Thus, the centrifugal force vector adds to the lifting force vector on the rotor blades; composing an additional radial force vector on the rotor blades at the downstream, leeward and upstream passages, but a reversed radial force vector windward. Thus, the resulting pulsating force vector reaches its maximum at leeward and minimum at windward; which difference increases the risk of material fatigue, critical vibration resonance modes and undesired noise from the turbine rotation. Rotors provided with straight rotor blades exhibit these design challenges which have to be overcome at the design of attachments to the rotor blades. It is further known that transversal turbines having three straight rotor blades cannot start by themselves at low fluid velocities, but by the generator; while helical rotor blades are easier to start. Rotor blades of helical shape are known, amongst other from CA 2674997 which describes a wind turbine having helical rotor blades arranged vertically and attached directly at multiple locations to the hub on the axis of the turbine. Also, in WO2120153813(A1) a water turbine is described in analogy with the said Darreus turbine NL19181 but provided with multiple rotor blades; and in WO2120152869(A1) which describes a water turbine of foldable rotor blades of helical shape. Thus, as it may be realized, a rotor provided with helical rotor blades exhibits advantages which can be further emphasized and developed.

SUMMARY OF THE INVENTION

A first purpose of the claimed invention is to provide a turbine adapted to extract energy from a streaming fluid by rotation of a rotor around the axis of turbine rotation oriented substantially at right angle to the current fluid direction. For that purpose, the claimed invention introduces a new type of rotor to achieve an increased efficiency compared to existing transversal turbines of vertical or horizontal axes of rotation.

A second purpose of the claimed invention is to overcome or improve on at least one of the disadvantages of prior art or provide a useful alternative.

At least one of said purposes is achieved by a turbine according to claims 1-12.

As used in this application,
the technical term "axial" means a direction parallel to the axis of turbine rotation, while "radial" means a direction at right angles to said axis;

the technical term "cross section" means a plane figure as emerged from cutting a load carrying structural element at a right angle to its longitudinal axis;

the technical term "centre line" means a line normal to a plane including said cross section, footed on the symmetry line or skeleton line or centre point of said cross section. A "centre line" is also used if the longitudinal axis of an element is not straight, that is has the property of being curved. A "skeleton line" (Q) means a line interconnecting the centre points of circles inscribed by the contour boundary curves of a wing profile, that is exhibiting the same distance to the upper and the lower wing area of a wing profile;

as used herein, the expression "attached to" or "joined to" or "enclosed by" another part means that the subject part may either be directly attached to or joined to or enclosed by the other part, or intermediate parts may also be present. On the contrary, in case of a part referred to as "directly attached to" or "directly joined to" or "directly enclosed by" another part; there is no intermediate part at hand;

moreover, the expression "fixed attachment" or "fixedly attached" means that rotation and translation between parts of the joint are not possible, while the technical term "bearing" means that rotation and translation between the joined parts are possible; so a "plain bearing" allows axial translation without rotation, and "roller bearing" allows rotation without axial translation;

the numeral term "first", "second" and "third" are purposively aimed at distinguishing singularity of a plurality of mutually permutable elements, but not to physically number them; that is any of the said elements may be considered as the "first", "second" or "third".

Thus, the claimed invention relates to a turbine adapted to production of useful energy from the motion of a streaming fluid and arranged at substantially right angles of the axis of turbine rotation to the current direction of the streaming fluid (W), comprising at least one turbine roller bearing comprising a rotatable bearing housing and a non-rotatable bearing housing, and exhibiting a centre point and a centre line passing through said centre point, and at least one hub arranged in fixed attachment to the rotatable bearing housing and to a supporting structure arranged in fixed attachment to the non-rotatable housing; and a blade body located in whole or in part in the fluid and arranged in attachment to the hub, wherein the motion of the streaming fluid makes the blade body feasible to rotate around the axis of turbine rotation which coincides with the centre line passing through a point identical to said centre point, comprising a plurality of rotor blades each of which extends continuously in the axial and radial direction of a helix exhibiting an axis coinciding with the axis of turbine rotation, and exhibits a handedness around the axis of turbine rotation and in a plane normal to the helix axis is provided with a cross section exhibiting a centre line normal to said cross section and a wing profile which is provided with two end sections, wherein a first end section is provided with a round nose (N) oriented to coincide with the direction of rotation (V) of the blade body and a second end section is provided with a taper (S) oriented in the opposite direction of rotation (V), wherein the turbine exhibits a point of intersection (PN) between the axis of turbine rotation and a line normal to the axis of turbine rotation, and a plurality of blade joints each of which exhibits a point of intersection (PB1) between the centre line of a first rotor blade and said line normal to the axis of turbine rotation and a point of intersection (PB2) between the centre line of a second rotor blade and said line normal to the axis of turbine rotation, wherein the points of intersection (PN, PB1, PB2) are joined by a joint line which is normal to the axis of turbine rotation and exhibits an end point in (PN), wherein the distance PN-PB1 is not equal to the distance PN-PB2, whereby said first and second rotor blade exhibit different hands around the axis of turbine rotation and are attached to each other by at least one of said blade joints, and the blade body exhibits a diameter (D) and a mid-point (PM) coinciding with a point of intersection between the axis of turbine rotation and the mid-normal plane (M).

The claimed invention is characterized in that said blade joints are attached to each other by intermediate parts consisting of said rotor blades.

Thus, as it may be realized from the above (claim 1), that the rotation of the blade body is forced by the motion of a streaming fluid, that is the blade body may be situated either totally engulfed by the streaming fluid or surrounded by a part of the fluid that is non-streaming. Thus, the blade body cannot rotate when it is wholly located in said non-streaming part of the fluid; that is where the fluid is stationary or stagnant;

the fluid may in principle consist of any material and state of aggregation, should it be liquid or gaseous. For example, the fluid may consist of one or several gaseous elements such as air; or liquids such as water, or a mix of gases and liquids such may occur in a condensed steam. Thus, the fluid may be aggregated by two or more different elements, for example air and water; where the flow of these elements may have different magnitude and direction;

the term "handedness" stands to characterize whether the helical curve is turning to the right or the left. Consequently, a rotor blade may be either right-handed or left-handed. So, any two rotor blades may have either the same or different handedness; that is both rotor blades may be right-handed or left-handed, or a first rotor blade may be right-handed and a second rotor blade may be left-handed. Thus, according to the claimed invention, a first rotor blade being right-handed is attached to all rotor blades being left-handed; a second rotor blade being right-handed is attached to all rotor blades being left-handed, and so on until all right-handed rotor blades are attached. It should be noted that it is not a necessary condition of the claimed invention for the blade body to be symmetrical around the axis of turbine rotation, that is rotor blades of different hands need not be equal in numbers and rotor blades of the same hands need not exhibit the same helix angle, need not be equidistant, need not be separated and unattached to each other;

there is a blade joint for each crossing of a right-handed and a left-handed rotor blade, where the blade joint attaches both rotor blades at their intersection. Consequently, each right-handed rotor blade is attached to all left-handed rotor blades by one or more blade joints, similarly are all left-handed rotor blades attached to all right-handed rotor blades by the same blade joints. The number of blade joints depends on the number of rotor blades and their helix angles. For example, 21 blade joints are required to attach three right-handed rotor blades to three left-handed rotor blades in making one full turn (that is pitch is equal to 1) over the full length (L) of a blade body. That rotor design is denoted (3+3)×1. The helix angle (γ) is equal to the angle between the centre line of the rotor blade and the projection of the axis of turbine rotation onto the rotor blade;

the term "blade body" means the rotational symmetry space body confined by two end planes (M1, M2) which are normal to the axis of turbine rotation and include at least one point of a rotor blade that is a tangent to the rotor blade in the axial direction, and by the inner and outer concentric rotational surface generated by the envelope to the rotor blades when the rotor is revolving. The radius from the axis of rotation to the inner rotational surface is less than the radius to the outer rotational surface, as measured in each plane which is normal to the axis of turbine rotation and located between said two end normal planes (M1, M2). The term "mid-normal plane (M)" means the plane which is symmetrical to the two end normal planes (M1, M2), and the length (L) of the blade body means the distance between the two end normal planes (M1, M2);

the blade body is part of the turbine, but it does not constitute a solid body as is rather an inhomogeneous space open in the two end normal planes and the inner and outer rotational surfaces. Thus, the blade body extends continuously and circumferentially around the axis of turbine rotation to form a grid of criss-crossing rotor blades, wherein the blade joints are the nodes and the rotor blades are the mesh; so, the rotor blades are only attached to each other by the blade joints. Because each blade joint attaches two rotor blades of different hands with each other, each right-handed rotor blade is attached to a left-handed rotor blade by said blade joint. For this reason, the twisting moment introduced to a rotor blade by the handedness itself, has opposite direction for different hands; so in a blade joint, the resulting twist is zeroed out for two identical rotor blades of different hands but of the same helix angles. In practice, this feature makes the blade body twist-free when it is not spinning, that is without any significant built-in twist-induced stresses which may give rise to undesirable deformations of the blade body;

the blade body constitutes of a self-supported structural entity designed by the rotor blades supporting each other in the blade joints only. The bending and torsional stiffness of the blade body depend on, among other things, the number of blade joints, length and diameter of the blade body. Thus, the blade body may bend in the direction of the fluid flow due to its load impact on the blade body; which effect displaces the axis of the blade body from the straight axis of turbine rotation. The blade body may then consequently revolve around a curved axis of rotation, which means that parts of the blade body may not always be oriented at right angles to the current fluid direction;

the rotor blades may be designed with a shorter span length and of reduced scantlings than for other types of turbines equipped with separate rotor blades, such as horizontal axis designs and vertical H-rotors; because the number of nodes increases as the rotor blades support each other in the blade joints. In addition, the rotor blades may be designed with a 'rounder' and more belly cross section, that is a 'thicker' wing profile of relatively larger height as compared to the chord length of said types of turbines equipped with separate rotor blades. That affects the section modulus for bending and torsion to increase and stresses to reduce in and between the support nodes (the blade joints) and the blade body to stiffen. Thus, since the rotor blades are being helical, the angle between the centre line of a rotor blade and the axis of turbine rotation is equal to the helix angle (γ); and as the fluid is substantially directed at right angle to the axis of turbine rotation, it may be realized that the complement angle (β) between the centre line of the rotor blade and a line normal to the projection of the axis of turbine rotation on the rotor blade is equal to 90 minus (γ) degrees.

Thus, it may be realized that the effective chord length of the wing profile, that is in the direction of the fluid; becomes extended by a factor equal to the inverse of sinus (γ) as compared to the chord length of the physical cross-section, that is as measured at right angle to the rotor blade. Also, since the ratio between the 'thickness' or height of the wing profile and the chord length may be assumed to be fixed for a certain turbine size, the rotor blade must in practice be designed with a wing profile height that is correspondingly increased to obtain the more belly cross section required.

the said shorter span of the rotor blades provides for a considerable larger ratio of span over chord length, with the span being set to the length of the rotor blade curve between two blade joint, as compared to other said turbine types with separate rotor blades. The ratio for rotor blades according to the claimed invention is typically a number between 100 and 150, which indicates a low flow-induced resistance. The high ratio also makes the fluid feasible to flow in whole or in parts in a laminar stream over the wing profile, that may experience a low Reynolds number at high fluid velocities, which reduces the resistance of the rotor blade and increases the turbine efficiency;

the continuous helical design of the rotor blades provides for the favourable feature of the blade body as in position for an optimal angle of attack to the fluid flow somewhere around the angle of rotation, thereby enabling the blade body to start a rotation. The angle of rotation (θ) is defined by an angle which is located in a plane normal to the axis of turbine rotation and has an apex coinciding with the axis of turbine rotation. The angle of attack (α) is defined by an angle between the chord and the apparent direction of flow of a wing profile;

the continuous and integrated helical rotor blade design exhibits the favourable feature to accommodate and distribute the load from the fluid more steadily than rotor blades of a straight design, since the moment of rotation is distributed over at least one sector of angle of rotation; whereby the pulsating cosines load is distributed more uniformly over the entire angle of rotation. In this way the risk of material fatigue, undesirable vibrations and resonance of the blade body can be eliminated or considerably reduced; as well as the noise from the wind turbines as compared to rotor blades of straight design which generates a beating noise at each passage of the wind tower mast.

Thus, it may also be realized from the above (claim 1) that two rotor blades are joined to each other on different radial distances to the axis of turbine rotation, which may compare to a flyover intersection. By that design, the risk is reduced that turbulent flow from a forerunning rotor blade should affect the rotor blade laying behind, different cross sections may be used for rotor blades on different radial distances to the axis of turbine rotation in order to maximize the energy from those rotor blades having the largest rotational speed. that is exhibiting the largest distance, as well as from those rotor blades having the lowest speed at the smallest distance;

unnecessary twist and skewness of the cross section of the rotor blades with subsequent secondary torsion moment in the rotor blade caps and loss of effect, may be avoided if the resulting lifting force vector over the wing profile of both rotor blades attach in one and the same line normal to the axis of turbine rotation; which is feasible since both of the aerodynamic centres of the wing profiles of a blade joint may have the same distance to the nose (N) in relation their respective chord length;

the helix of the rotor blades may be generated in such a way that each of the inner and outer rotational surfaces form a cylindrical, right conical, double-conical or bi-conical frustum, wherein the blade body volume is limited by said inner and outer rotational surface and said end normal planes (M1, M2); which means that the blade body may take the most appropriate of 16 (4×4) different shapes of turbine design;

the blade body may alternatively be supported by two hubs, for example in both end normal planes (M1, M2) simultaneously, and thus constitutes a double-supported helical turbine, for example implemented as several water turbines mounted in a row across a river and arranged with a common axis of turbine rotation. For an embodiment of the claimed invention, it should be noted that it is not a necessary condition that the centerline is vertical when passing through the turbine roller bearing but may take any angle in the plane normal to the fluid direction, for example horizontal or oblique. An essential advantage of the single or double supported helical turbine as per the claimed invention, is the absence of a central supporting mast; so allowing the fluid flow to pass through the blade body without being unnecessarily disturbed, thereby some favourable qualities are achieved: such as the turbine efficiency is increased which is reducing the cost per produced effect, and any annoying noise or turbulence can be avoided since no non-rotating body is being located upstream of the blade body that will create a stationary pressure gradient downstream, such as heard from conventional horizontal wind turbines when a swishing noise is generated by a straight rotor blade is passing in front of the wind power mast at each revolution. This advantage makes the claimed invention suitable to locate in urban environment.

According to an embodiment of the invention a first blade joint exhibits a distance PN-PB1 larger than the distance PN-PB2 and a second blade joint exhibits a distance PN-PB1 smaller than the distance PN-PB2, wherein no blade joint is located between said first and second blade joint.

Thus, it may be realized from the above (claim 2) that the rotor blade which exhibits the smallest radius to the axis of turbine rotation in one blade joint does exhibit the largest radius in the blade joints nearby. This transposition of a rotor blade between two adjacent blade joints, means that the rotor blade belongs to the outer and inner rotational surface of the blade body interchangeably like a sine wave with maximum amplitudes in the blade joints and zero amplitude amidst two blade joints. The sine curve of a waving right-handed rotor blade is displaced by a factor ($\pi$) in relation to the sine curve of a left-handed rotor blade; that is 180 degrees, or reversed as these are of the same amplitude. For a viewer of the blade body, this gives the impression of an undulated blade body since the rotor blades are altogether braided; that is the helix is superimposed by a sine curve in its axial and radial direction. It should be noted that the definition of a (non-superimposed) cylindrical or conical helix requires the amplitude of the said sine curve to be zero in order to maintain a constant angle between the tangent to the centerline of a rotor blade and the axis of turbine rotation, which is not the case for said superimposed helix. The advantage of such an undulated blade body is a reduced risk of turbulence in the wake from fore-running rotor blades and rotor blades are firmly held in place by compressed bars in all blade joints, since interwoven rotor blades are constrained and cannot depart.

According to another embodiment of the invention said first blade joint exhibits a first sum of the distances PN-PB1 and PN-PB2, and said second blade joint exhibits a second sum of the distances PN-PB1 and PN-PB2, wherein said first sum is equal to said second sum.

Thus, it may be realized from the above (claim 3) that the diameter (D) of the blade body is equal to the average diameter, that is (D) is measured to the midst of the "wall thickness" of the blade body, so the blade body consequently exhibits one and the same diameter (D) along its length.

According to another embodiment of the invention the blade joint comprises two blade caps each of which is provided with a cross section exhibiting a centre line parallel to the centre line of the rotor blade, wherein said cross section in whole or in part encloses the wing profile of the rotor blade.

Thus, it may be realized from the above (claim 4) that the advantage of embracing caps is the rotor blades become reinforced on the outside, where the largest bending stresses occur in the cross section, and may be located without any joint at the intersection with the blade joint and without holes being drilled for connecting the caps; all of which reduces the risk of fatigue of the rotor blades. A further advantage is the caps may be designed for a wing profiled cross section of a rotor blade with a nose in the direction of rotation and comprise a slot in the opposite direction of rotation, thereby facilitate a snap-in of a rotor blade from said slot due to the elastic design of the caps. The caps may then be closed, for example by friction or a bolted joint (not shown). This device allows the rotor blades to freely adjust to each other in the blade joint, so unnecessary intrinsic stresses may be avoided during assembly of the blade body.

According to another embodiment of the invention the blade joint comprises a bar joint attaching two blade caps with one another in a blade joint and is provided with a bar provided with a cross section exhibiting a centre line, wherein said centre line coincides with said joint line.

Thus, it may be realized from the above (claim 5) that the bar joint has the primary function to joint two intersecting rotor blades with each other which are located on different radiuses to the axis of turbine rotation. The bar is particularly well suited to accommodate compression from rotor blades of undulated blade bodies.

According to another embodiment of the invention the bar joint comprises at least one bar roller bearing provided with a centre line coinciding with the centre line of the bar, wherein said bar roller bearing makes reciprocal rotation of the centre lines of the rotor blades feasible around said joint line.

Thus, it may be realized from the above (claim 6) that the bar roller bearing allows the helix angle ($\gamma$) of the rotor blades in a blade joint to change and, since the blade body is integrated, the magnitude and direction of that change may be identical for all rotor blades of the blade body. That constrains the length (L) and diameter (D) of the blade body to change homogeneously and simultaneously. As for example, the helix angle (γ) may be reduced to almost zero; that is diameter is almost zero, or increased to almost 90 degrees; that is length is almost zero, which makes the blade joints transportable as almost plane and the blade body transportable as a coil.

According to another embodiment of the invention said rotor blades are manufactured of polyolefin, such as of polyethylene or polypropylene; or of polystyrene or of polyvinyl chloride or of metal, such as of aluminium; or of a combination of two or more of said materials.

Thus, it may be realized from the above (claim 7) that the rotor blades may be manufactured of thermoplastics, which material makes them highly adaptable to the surrounding environment (E) and formable to different operating conditions.

According to another embodiment of the invention said rotor blades are produced in a manufacturing process by extrusion or by co-extrusion.

Thus, it may be realized from the above (claim 8) that the rotor blades may be mass-produced in a machine for extrusion of a plastic material or co-extrusion of two or more plastics of different material properties; that is forced by high pressure through a die representing the wing profile of the rotor blade, thereby obtaining its proper shape in sufficient length. The manufacturing process of extrusion and co-extrusion result separately or combined, in rotor blade features such as:
  continuous which makes them producible in whole length for the turbine, thereby jointing of shorter lengths by welding may be avoided;
  smooth which makes then suitable for wing profiles designed for full or partial laminar flow, thereby post-process surface grinding may be avoided;
  rough which makes them suitable for wing profiles designed for full or partial turbulent flow, thereby application of coarse texture may be avoided;
  strong with tensile strength between 20-50 MPa depending on the plastics used, thereby unnecessary heavy rotor blades may be avoided;
  weldable which makes them easy to repair and complete on site when necessary, thereby de-assembly of rotor blades may be avoided;
  floating, since many thermoplastics have a material density less than that of water, thereby rotor blades are floatable and may be towed by a tug boat;
  weather-resistant by co-extrusion with an outer UV-resistant material, thereby various material properties may be achieved for different parts of the cross section of the wing profile;
  long lasting by choice of materiel properties designated to ambient temperature and loads, thereby creep deformation is controlled over the design period.

This is applicable to homogeneous cross sections as well as inhomogeneous.

According to another embodiment of the invention the wing profile of the rotor blade is limited by a closed outline curve located in a plane normal to the centerline of the rotor blade and encloses an area provided with at least two section holes each of which is limited by a closed boundary curve, wherein said boundary curve is not exhibiting a point of intersection with said outline curve or any other boundary curve.

Thus, it may be realized from the above (claim 9) that the cross section has at least two holes separated by a continuous and tight inner wall and in addition a continuous and tight outer wall facing the outer contour of the wing profile. By this means, requirements are set on material but not thickness off the inner and outer wall. Thereby the cross section is inhomogeneous and the wing profile exhibits the features of being hollow. Said holes constitute at least two separate and distinguished channels in the cross section. A tight inner wall may preferably by located at right angles to the chord at a distance of about 25% of the chord length from the nose, to reduce the rotation of the cross section which may occur around the centre line due to a deviation of the point of lifting force application from its aerodynamic centre on the wing profile (see claim 1)

The manufacturing process of extrusion and co-extrusion of wing profiles with holes result separately or combined, in rotor blade features being:
  weight efficient, providing maximum bending resistance, torsional resistance and shear area in relation to the mass, wherein all abundant areas of the cross section are excluded;
  hollow, which makes said channels usable to accommodate cables and pipes, for example for the purpose of measuring flow velocities and record environmental data; monitor and control turbine function and efficiency; measure stress, pressure and temperature inside the rotor blades; conduct tightness tests and material sustainability of the rotor blades; control flow through the rotor blades and illumination of the turbine; contain electronic systems for identification and geographical information; and to provide a highway for data communication systems. These channels may be reinforced on the inside of the wall, for example by reinforcement elements (see claim 10);
  lightweight, so a small mass of rotor blades makes the turbine easy to start since less lifting force is required to initiate rotation of a blade body of less weight than of more weight; which give rise to smaller bearing loads as blade body weight is less, and makes the turbine easier to transport, assemble and repair;
  flexible, which makes the rotor blades possible to twist into helices; for example, two short rotor blades of different handedness in less than about 10 m of length may easily by craftsmanship be assembled with a blade joint in each end into said helices. That flexibility makes rotor blades suitable for spooling onto drums for transport to the assembly site or storage for smaller turbines;
  easy and quick to produce, since one and the same cross section of wing profile may be used for the whole length of the rotor blade; and should a rotor blade fail, it may be reproduced at an extrusion facility nearby;
  inexpensive to procure thanks to mass-production, which reduces the cost per produced kWh and makes the turbine attractive for investors.

Extrusion of profiles with channels is known technology, for example used for fillers in high voltage submarine cables; so is co-extrusion of plastic profiles, but not for use as rotor blades. Also extruded wing profiles of aluminium is known technology used for straight rotor blades, but not for helical rotor blades as per the claimed invention.

According to another embodiment of the invention the rotor blade comprises at least one reinforced element provided with a cross section exhibiting a centre line, wherein said reinforced element is located in at least one of the section holes and said centre line of said reinforced element is parallel with the centre line of the rotor blade.

Thus, it may be realized from the above (claim 10) that reinforced elements are supplementary to blade caps for the purpose of evenly distributing the forces to the rotor blades, particularly at the connection to the blade caps and thus reduce the stresses and accompanying risk of material fatigue in these hot spots. The cross section of a reinforced element may typically exhibit a bending section modulus between 30 to 150 percentage, preferably 100 percentage, of that of rotor blade without any reinforced element. The cross section of a reinforced element may for example be designed as an I-beam to allow free passage through the openings between the upper and lower flanges of the I-beam. The extent of the reinforced element along the rotor blade need not coincide with that of the blade cap.

According to a further embodiment of the invention the rotor blade exhibits a first section provided with a first end wall and a second section provided with a second end wall, wherein the rotor blade and said end walls altogether constitute a body provided with a closed surface against the surrounding environment.

Thus, it may be realized from the above (claim 11) that each end wall constitutes a plane mainly normal to the centerline of the rotor blade. Said transverse end walls may be located in just any section of the rotor blade, for example at both ends of the rotor blade Thus, the end walls may be located anywhere along the rotor blade in order to divide the rotor blade into tight partitions. For example, two tight partitions may be constructed by one transverse end wall being welded to each end of the rotor blade, the rotor blade being cut off in the mid-normal plane (M) in two parts and an additional transverse end wall being welded to the first part of the rotor blade while the rotor blade is restored to its original state by the second part also being welded to the additional end wall of the first part. Thus, the rotor blade may possess the feature of permanently enclosing a mass, such as inert gas (for wind turbines) or air (for water turbines) for the purpose of minimizing the mass of the enclosed volume of said partitions and obtain a lighter weight and reduced bearing forces. It would be obvious for a person skilled in the art that the said closed surface may be penetrated by one or a plurality of holes, which may be closed by a cover arranged for closing and opening of said closed surface to the surrounding environment (not shown). Thus, the rotor blade may be featured to add mass through said holes and/or withhold masses by means of closing said holes and/or drain masses by means of opening said holes; for example, a gas or liquid used for tightness or pressure test of the rotor blade. The covers may be equipped with one or more penetrations furnished with a tight locking device.

According to another embodiment of the invention at least one blade cap or reinforced element is manufactured of composite materials made of fibres of glass, carbon or Kevlar included in a material made of synthetic polymer.

Thus, it may be realized from the above (claim 12) that reinforced elements and blade caps are highly stressed structural design elements which may benefit from being moulded, for example in an autoclave; thereby pre-manufacturing becomes possible and shaping on site may be avoided.

BRIEF DESCRIPTION OF THE DRAWINGS

The claimed invention will here be described in more details with reference to figures showing unlimited examples of various embodiments. It should be noted that the various embodiments are shown mainly to explain the fundamental principles of the claimed invention and not to restrict the extent of the protection granted, which is defined by the claims. It should also be noted that the figures are not to scale and the dimensions of some features of the claimed invention have been exaggerated for the sake of clarity. In particular, the blade body has a three-dimensional real design which may deviate from the sketchy models as presented by the figures.

FIG. 6 View in perspective of a blade joint centered on a joint line which is normal to the axis of turbine rotation.

FIG. 7 Schematic view of the blade body with undulating rotor blades.

FIG. 8 Schematic view of the blade body with non-undulating rotor blades

DETAILED DESCRIPTION OF PREFERRED EMBODIMENTS

Figure 1:
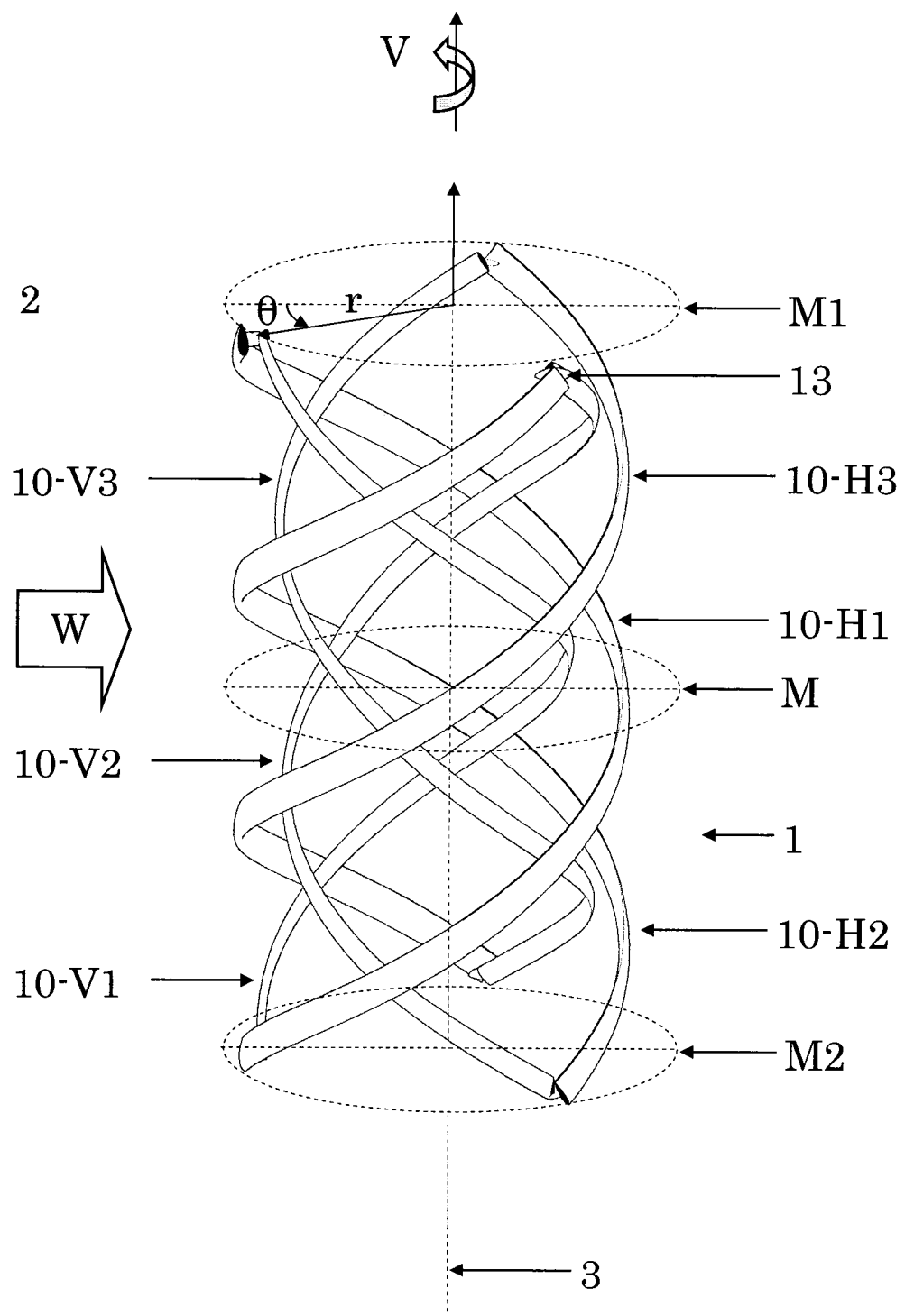
FIG. 1. View in perspective of the rotor blades of the blade body according to the first aspect of the claimed invention.

FIG. 1 shows a perspective of a blade body (9) according to the claimed invention and an axis of turbine rotation (3) around which the blade body is supposed to revolve. The blade body is situated in a streaming fluid (2) which has a vector of velocity (W) directed at right angles to the axis of turbine rotation and is attacking the blade body head on at an angle of rotation (θ) equal to zero. The extent of the blade body along the axis of turbine rotation, that is axially, is limited by the two end normal planes (M1) and (M2) which stand at right angles to the axis of turbine rotation; and is enclosed radially by the outer and inner concentric surfaces generated by the envelope to the respective outer and inner rotor blades when the blade body rotates at a radius (r). The blade body as shown in FIG. 1 has an inner and outer envelope surface both representing a double cone frustum and the two end normal planes (M1, M2), so the largest distance between the envelope surfaces appear in the mid-normal plane (M). It should be noted that FIG. 1 is primarily intended to show the geometrical design of the rotor blades and not how these are jointed to each other or to the turbine (1). Thus, FIG. 1 indicates only one blade joint (13) of each pair of criss-crossing rotor blades are being connected to each other by a blade joint only, which is the main characteristics of the claimed invention.

FIG. 1 shows the blade body built by six rotor blades curved in a helix, whereof three are right-handed (10-H1, 10-H2, 10-H3) and three are left-handed (10-V1, 10-V2, 10-V3). The rotor blades are manufactured of extruded plastic profiles which elasticity makes them twistable to a suitable radius (r). FIG. 1 shows the rotor blades being twisted one turn for the whole length of the blade body, that is pitch is equal to 1. Every right-handed rotor blade is jointed to a left-handed rotor blade in both ends: so is 10-H1 connected to 10-V1 by one blade joint (13) in (M1) and another blade joint (not shown) in (M2), 10-H2 connected to 10-V2 by a blade joint (not shown) in both (M1) and (M2), and 10-H3 connected to 10-V3 by a blade joint (not shown) in both (M1) and (M2); that is by six blade joints. In addition, each right-handed rotor blade is connected by a blade joint (not shown) in (M), that is by three blade joints. Since no right-handed rotor blade is crossing any other right-handed rotor blade and no left-handed rotor blade is crossing any other left-handed rotor blade, each right-handed rotor blade in FIG. 1 crosses the other two left-handed rotor blades in the area between (M1) and (M), that is by six blade joints; and in the area between (M2) and (M), that is by additionally six blade joints. This makes in total 21 blade joints required to build the blade body in FIG. 1.

FIG. 1. indicates that all rotor blades are provided with a wing profile with a round nose pointing in the direction of rotation (V) of the blade body and taper (S) in the opposite direction. Thus, all rotor blades are exposed with a wing profile in the direction of rotation that is suitable for generating the lifting force needed to spin the turbine. It should be obvious for a person skilled in the art that FIG. 1 only shows one of a vast number of embodiments of the claimed invention. For example may the pitch, number, length and undulation of rotor blades vary at one and the same combination of length (L) and diameter (D) of the blade body. In addition, the blade joint height may vary; that is the bar length, so the blade body may adopt one of 16 different generic combinations of inner and outer envelope surfaces: cylindrical, conical, double-conical and bi-conical. Finally the relation of length (L) and diameter (D) of the blade body may also vary.

Figure 2:
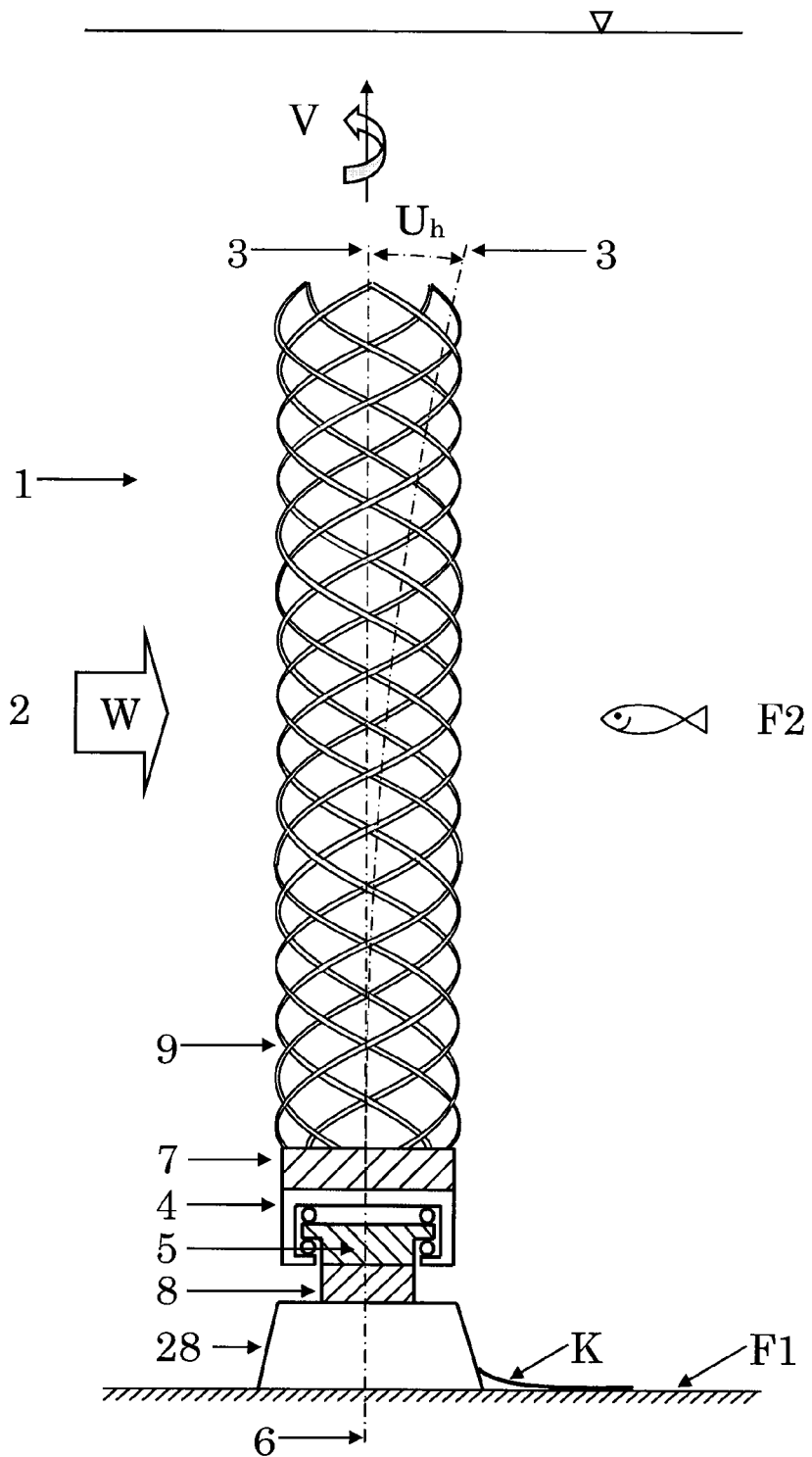
FIG. 2. Schematic view from aside the turbine as installed on the seafloor according to the second aspect of the claimed invention.

FIG. 2 shows a turbine (1) arranged to extract energy from the streaming fluid (2) of a body of water (F2) with a seafloor (F1). For the sake of simplicity, the term "seafloor" is used irrespective of the water is a body of an ocean, a sea, a lake or a river. The turbine (1) is shown to include a blade body (9) connected to a hub (7) fixedly attached to a rotating housing (4) of a turbine roller bearing, while the non-rotating housing of said turbine roller bearing is fixedly attached to a support structure (8) fixedly attached to a power plant (28). FIG. 2 shows the turbine wholly submerged into the body of water, but the turbine may alternatively be partly submerged such as for example in shallow tidal bays. FIG. 2 further shows a power plant provided with a power cable (K) installed on the seafloor. For the sake of simplicity, the term "power cable" is used irrespective of the media contained in the cable is electric current, liquid, gas or information; and of the direction such media is transmitted. Thus, it may be realized that the power cable may be used to transmit energy to users, for example located onshore; but may not be used in case all energy produced is also consumed for operation of equipment onboard the power plant, for example to circulate oxygenated water. Except from the blade body, the rest should be regarded as known technology.

The turbine (1) in FIG. 2 is vertically oriented exhibiting a vertical centre line (6) passing through the rotatable housing (4) of the turbine roller bearing, at which the axis of turbine rotation (3) of the blade body coincides with said centre line in a centre point of the turbine roller bearing. As indicated by FIG. 2 the axis of turbine rotation may be displaced in the free end to a length (Uh) in the direction of the fluid velocity (W), which means that the turbine is rotating around an axis of rotation that is bent to a curve. Another feature of the claimed invention is that the axis of turbine rotation also will deflect somewhat to the side (not shown) to the right and left and thus oscillate in a plane normal to (W). The said turbine roller bearing is designed to withstand the bending moment caused by the above deflections of the turbine and at the same time be adapted to fulfill its purpose of rotation.

Figure 3:
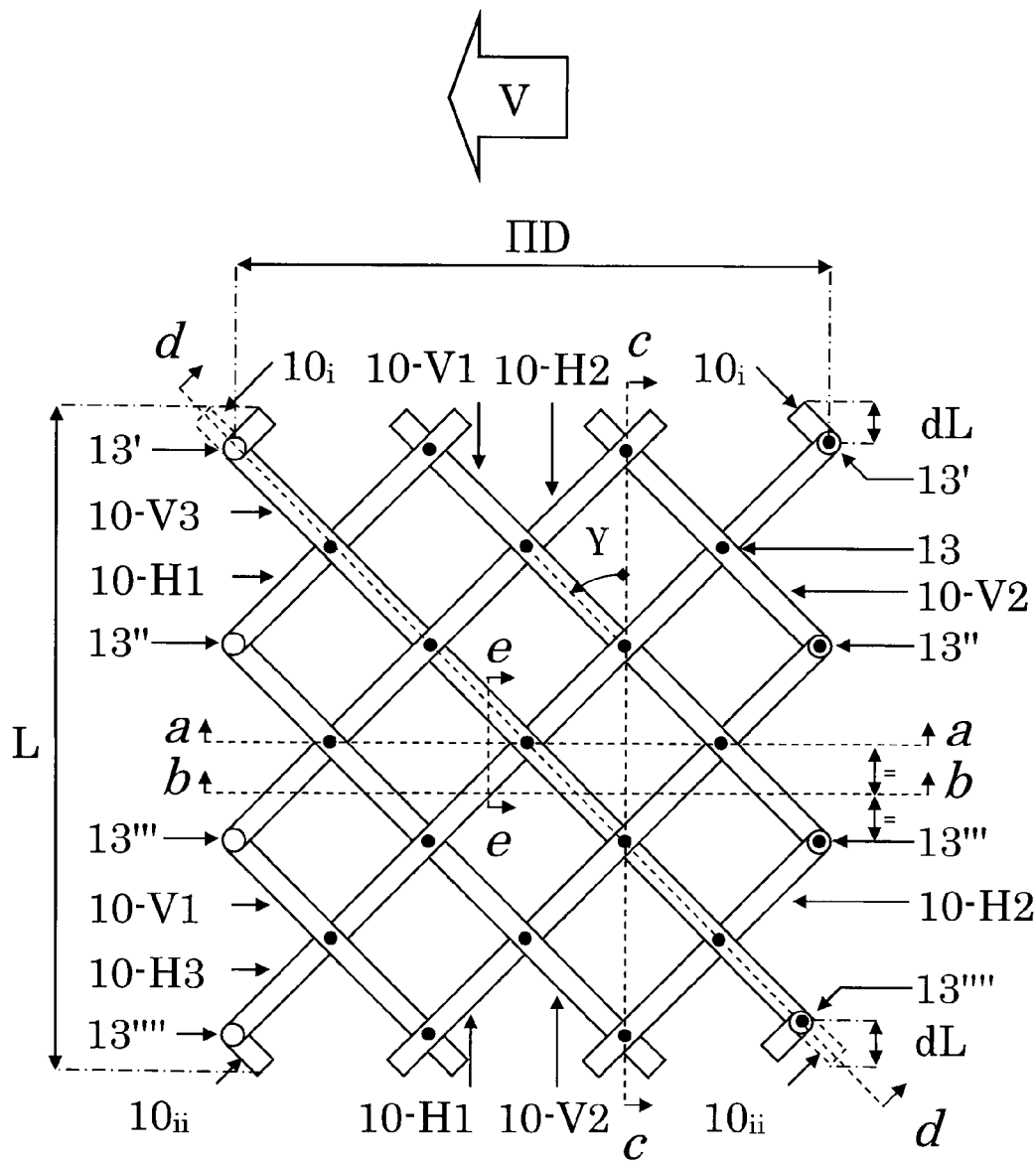
FIG. 3. View of the extent of a cylindrical blade body comprising 3 left-handed and 3 right-handed undulating rotor blades pitching 1 turn on the length L of the blade body.

FIG. 3 is aimed at visualizing a blade body (9) of length L and diameter D, that is sliced in the axial direction by a cut made in parallel to the axis of turbine rotation (3) through the blade joints (13', 13", 13''', 13'''') as seen from outside the blade body towards the axis of turbine rotation. FIG. 3 shows the blade body spread out in a plane, in which the breadth is equal to Π multiplied by D; exhibiting 21 blade joints (13) which connect three right-handed (10-H1, 10-H2, 10-H3) and three left-handed (10-V1, 10-V2, 10-V3) undulating rotor blades, which are pitched 1 turn on the length L and helix angle (γ).

The claimed invention does not limit the length of the rotor blades nor require blade joints (13) to be located in the end normal planes (M1, M2). This is shown by FIG. 1 as a part length (dL) of the whole length (L) of the blade body, so the part length (dL) corresponds to the distance between one of the end normal planes (M1, M2) and a blade joint (13); that is the rotor blade is provided with an end section which is not confined to a blade joint and therefore free to displace under load. Thus, it may be realized that such a single-side supported section of a rotor blade makes it possible for a constrained rotor blade to take on a lifting force on the free part length to offset, at least partly, the bending moment imposed in the rotor blade due to the lifting force incurred between two adjacent blade joints.

Figure 4:
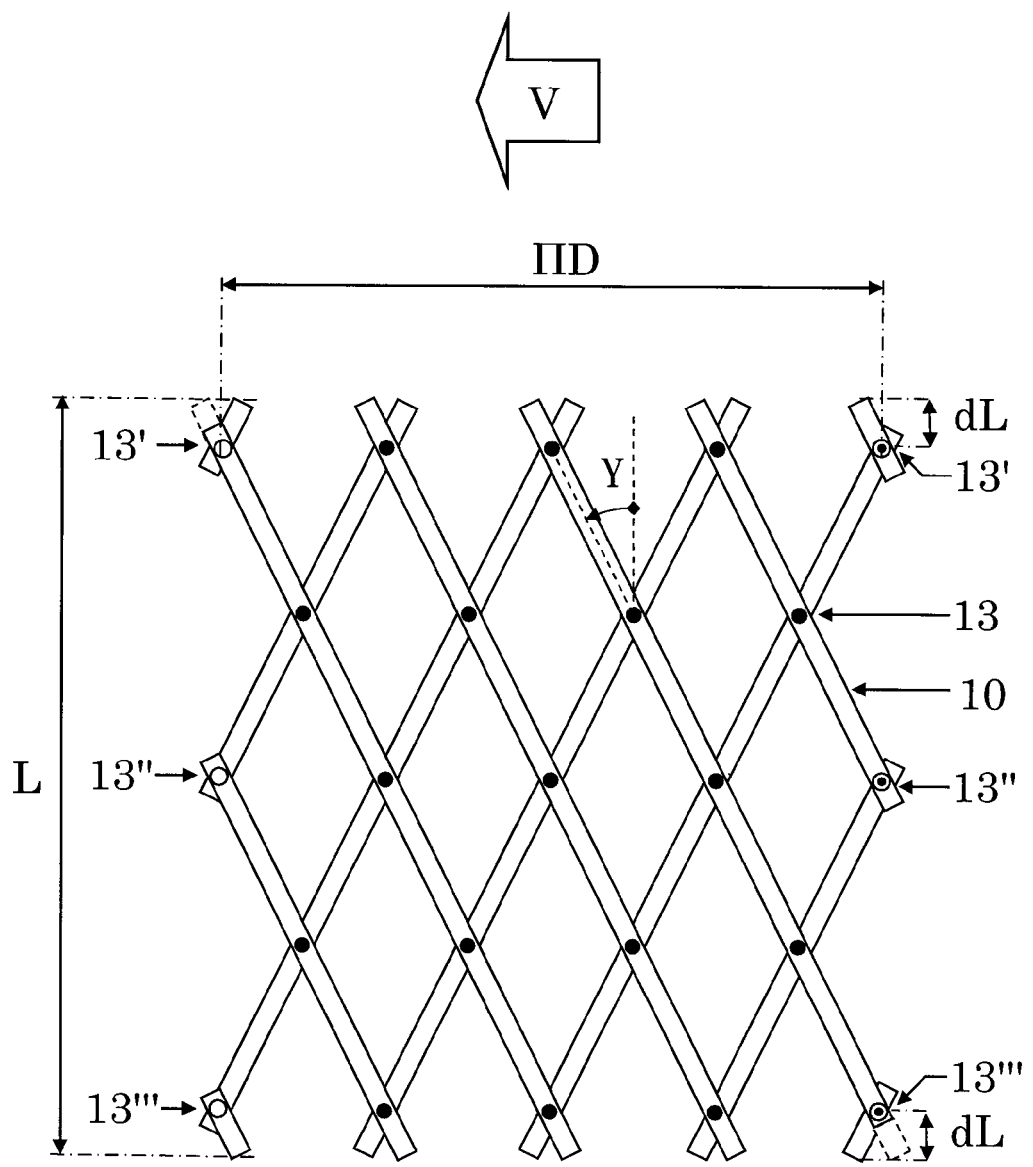
FIG. 4 View of the extent of a cylindrical blade body comprising 4 left-handed and 4 right-handed non-undulating rotor blades pitching 0.5 turns on the length L of the blade body FIG. 5 View of different sections cut through the blade body in FIG. 3.

FIG. 4 is aimed at visualizing a blade body (9) of length L and diameter D, that is sliced in the axial direction by a cut made in parallel to the axis of turbine rotation (3) through the blade joints (13', 13", 13''') as seen from outside the blade body towards the axis of turbine rotation. FIG. 4 shows the blade body spread out in a plane, in which the breadth is equal to Π multiplied by D; exhibiting 20 blade joints (13) which connect four right-handed and four left-handed non-undulating rotor blades, which are pitched 0.5 turns on the length L and helix angle (γ).

As mentioned above, the embodiments shown in FIGS. 3 and 4 are just two examples among a vast number of possible configurations of a blade body according to the claimed invention.

FIG. 5 shows the blade body sectionalized for the direction of rotation (V) as per FIG. 3, that is to the left as seen by a viewer located outside the blade body. Section a-a shows a cut made in the mid-normal plane (M) of the blade body, that is parallel to (V); intersecting three blade joints (13) and six rotor blades (10), so the nose (N) of the wing profile of all rotor blades is pointing in the direction of rotation (V). The distance between the centre lines of the rotor blades in the mid-normal plane (M) is represented by length (h0). Thus, section a-a shows all three left-handed rotor blades (10-V1, 10-V2, 10-V3) sharing a common radius (r) to the axis of turbine rotation (3) that exceeds the common radius (r) for all three right-handed rotor blades (10-H1, 10-H2, 10-H3).

As shown by FIG. 3, section b-b shows a cut made in between and equidistant from two blade joints (13), where all rotor blades share a common radius (r) to the axis of turbine rotation (3) because of the undulation It may be realized from FIG. 5 that such a common radius (r) is only derived if the distances are equal between the centerlines of the rotor blades in the mid-normal plane (h0) and in the blade joint adjacent to the respective end normal plane (h1, h2). In another example (not shown) the section b-b is not located equidistant from two blade joints but somewhere in between two blade joints; so all blade joints share a common radius (r) to the axis of turbine rotation but have a different distance (h0) and (h1) and (h2), that is only rotor blades of the same handedness have the same radius (r).

Section c-c in FIG. 5 shows an axial cut of the blade body intersecting four blade joints and eight rotor blades, so the nose of the wing profile of four rotor blades is pointing in the direction of rotation (V) and in the opposite direction for the remaining four rotor blades; that is because the section is cut at right angles to the direction of rotation (V). The section c-c does not intersect any rotor blades in the mid-normal plane (M) so the distance (h0) cannot be defined. The distances (h1) and (h2) are equally sized in this example, but may differ in other examples as described above.

As shown by FIG. 3, section d-d shows a cut in the centre line of rotor blade (10-V3) that is coinciding with the complement angle ($\beta$) to the current direction of fluid velocity (W). FIG. 3 shows the helix angle ($\gamma$) to be approximately 45 grader, which means that the centre lines of all right-handed rotor blades are almost aligned at right angles to the centerline of the rotor blade (10-V3); that is the cross section of all wing profiles are most belly as almost identical to the cross section as manufactured, which corresponds to the chord length (x0) in FIG. 11.

The undulation shown by FIG. 5 is a simulation of a sine curve. As shown by FIG. 3, (13') and (13'''') are different blade joints; while (10$i$) and (10$ii$) are different part lengths of the rotor blade (10-V3); thus, these parts may have different length. The distance (h1) and (h2) are equally sized in this example, but may differ in other examples as described above.

FIG. 6 shows a view in perspective of a blade joint (13) comprising two rotor blades (10) each of which provided with a cross section provided with a centre line (11) and a wing profile (12). A line (14) normal to the axis of turbine rotation (3) has a point of intersection (PN) with the axis of turbine rotation, while said normal line also has a point of intersection (PB1) with the centre line of that rotor blade which has the smaller distance, that is radius, from (PN); and in addition has a point of intersection (PB2) with that centerline which has the larger distance from (PN). As shown by FIG. 5, PB1 and PB2 are connected by a structure which is further described in FIG. 7.

FIG. 7 is meant to localize a first (15) and a second blade joint (16) and shows a view of an undulated blade body as seen from outside the blade body towards the axis of turbine rotation. As shown by FIG. 7, there is no blade joint located between said first (15) and second blade joint (16); that is the blade joints are the closest of neighbours.

FIG. 8 has the same purpose as FIG. 7, but of a non-undulating blade body. FIG. 8 shows that there is no blade joint located between said first (15) and second blade joint (16); that is the blade joints are the closest of neighbours.

Figure 9:
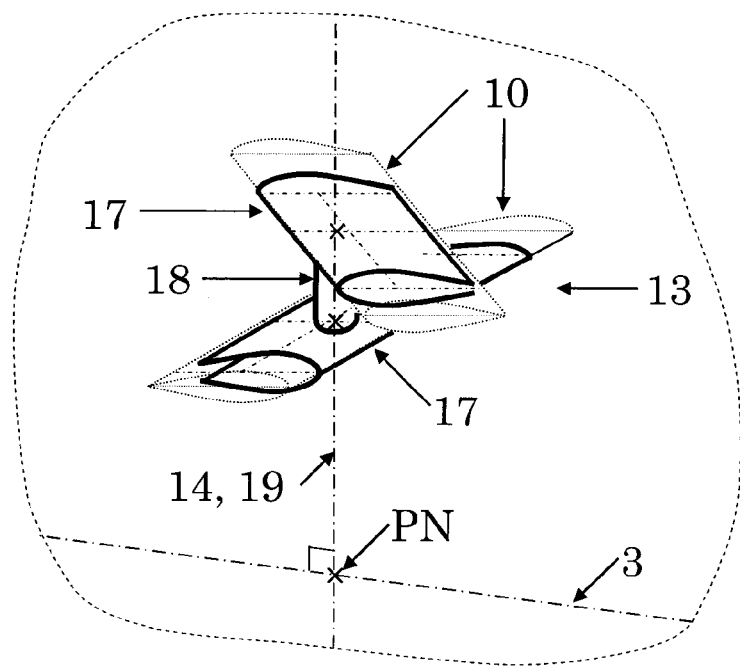
FIG. 9 View of two blade caps of the blade joint in FIG. 6.

FIG. 9 shows the blade joint (13) and rotor blades (10) in FIG. 6 (dotted line) comprising two blade caps (17, solid line) each of which is partly enclosing a wing profile (12) while leaving an opening slot in their respective tapers. At assembly of a blade cap (17) with a rotor blade (10) the rotor blade may be forced into the blade cap by nose first through said slot and use of external force and flexibility of design and material of the blade cap. It may be realized from FIG. 9 that the blade cap will fit the wing profile except in said slot, which is advantageous in accommodating the loads on the rotor blades and for distributing the loads to the blade joint.

In another embodiment of the claimed invention, a blade cap (not shown) comprises two parts, for example shaped to follow the upper and lower side of a wing profile, which are screwed, bolted or glued together to a firm joint. The two blade caps (17) of a blade joint are connected by a bar (18) as shown by FIG. 9, where the centre line (19) of said bar coincides with the joint line (14) that is normal to the blade joint.

Figure 10:
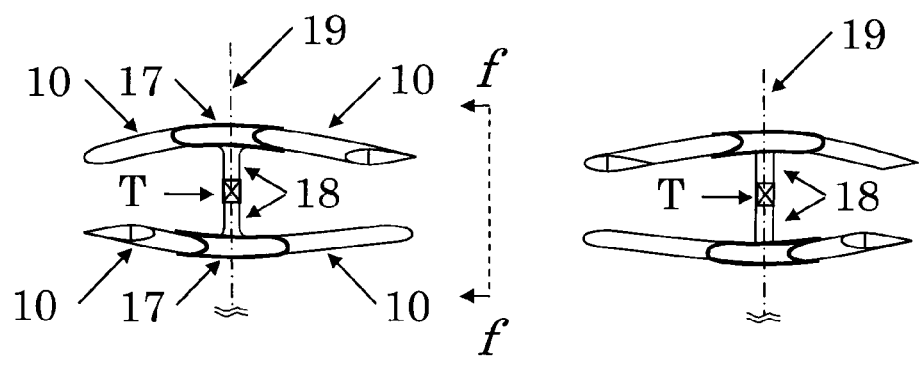
FIG. 10 View of two sections of a blade joint of the undulated blade body in FIG. 3.

FIG. 10 shows a view of a blade joint (13) as section e-e in FIG. 3, which comprises two blade caps (17) connected by a bar (18) including a bar roller bearing (T). The rotor blades (10) are free to rotate around the centre line (19) of the bar, so the helix angle ($\gamma$) may change. The rotor blades (10) are presented with a typical cross section in order to show the design and layout of the wing profile, which means that the direction of rotation is perpendicular pointing out of the paper towards the reader. Section f-f in FIG. 10 shows the blade joint where the direction of rotation is pointing to the left.

Figure 11:
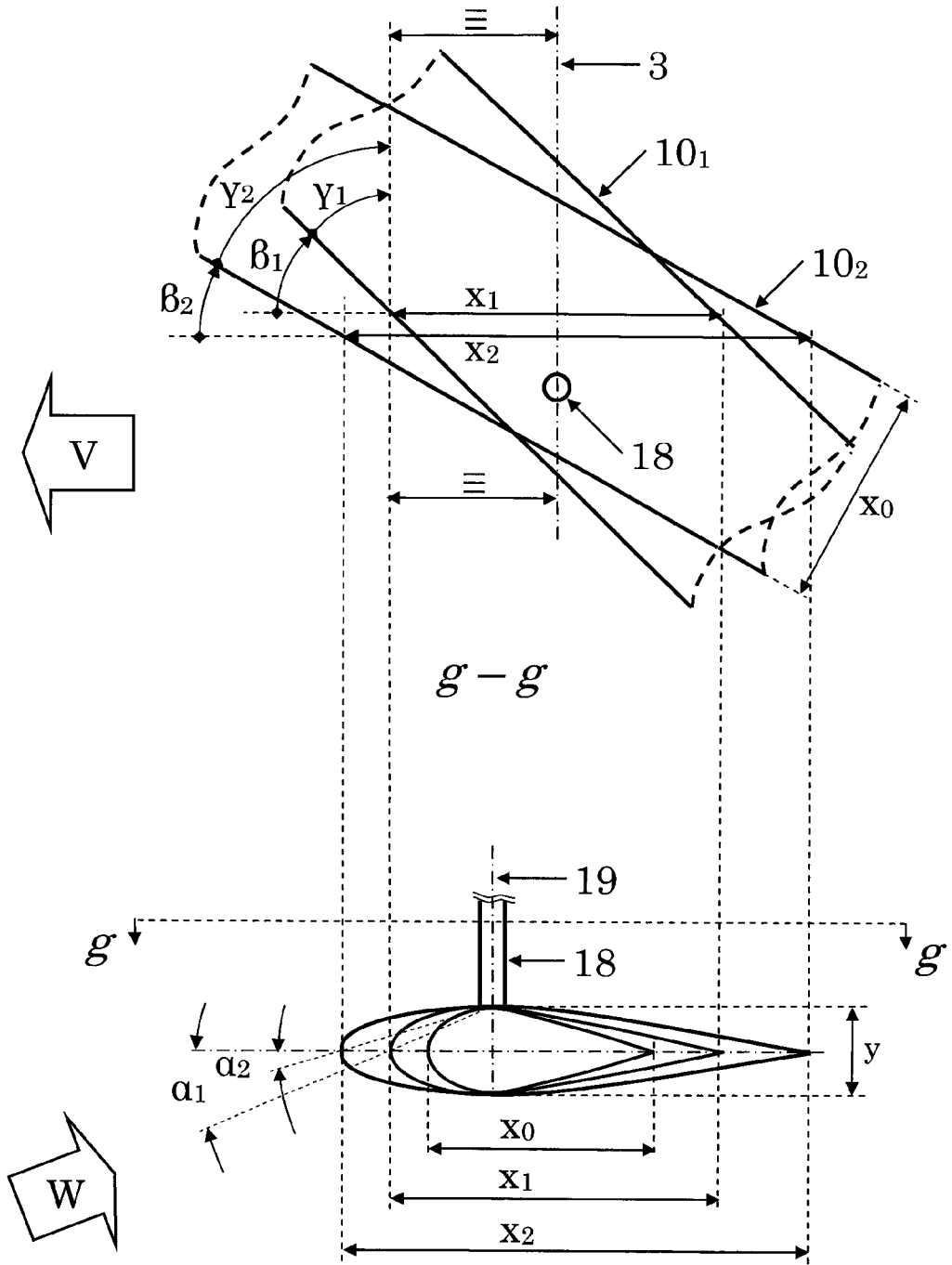
FIG. 11 View of a wing profile at various helix angles.

FIG. 11 shows in section g-g a view of a rotor blade ($10_1$) which is seen at right angles to the plane including the chord of the wing profile and exhibiting a helix angle ($\gamma_1$) and complement angle ($\beta_1$), so the sum of ($\gamma_1$) and ($\beta_1$) is equal to 90 degrees, and chord length ($x_1$) is in the direction of ($\beta_1$). After a rotation of the rotor blade ($10_1$) around the centre line (19) of the bar (18) to a new complement angle ($\beta_2$), the rotor blade ($10_2$) is exhibiting a new chord length ($x_2$), so ($\beta_2$) is smaller than ($\beta_1$) and ($x_2$) is larger than ($x_1$). The manufactured cross section of the rotor blade has a chord length equal to ($x_0$), which is less than both ($x_1$) and ($x_2$) as shown by FIG. 11. FIG. 11 also shows the thickness (or height) of the wing profile (y) remain unchanged, which means that the angles of attach ($\alpha_1$, $\alpha_2$) also change since the chord lengths ($x_0$, $x_1$, $x_2$) change with the helix angles ($\gamma_1$, $\gamma_2$). Thus, a larger helix angle ($\gamma_2$) means a longer chord length ($x_2$) and a smaller angle of attach ($\alpha_2$).

Figure 12:
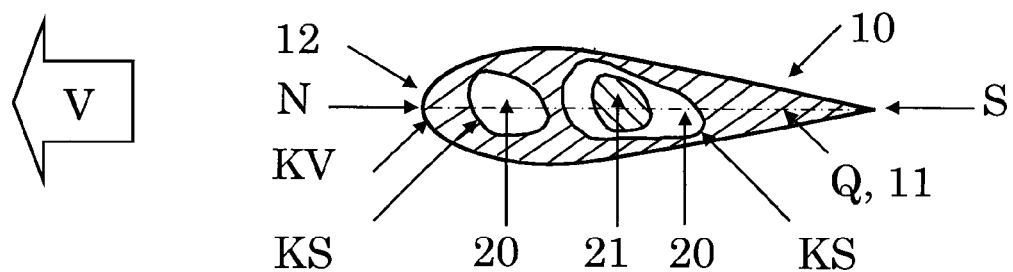
FIG. 12 Schematic view of a cross section of a rotor blade with a reinforced element.

FIG. 12 shows a view of a cross section of a rotor blade (10) with a centre line (11), which is also a symmetric line (Q) to the wing profile (12) provided with a nose (N) in the direction of rotation (V) and a taper (S) in the opposite direction. The wing profile is limited by a closed outline curve (KV) and the cross section comprises two section holes (20) each of which is limited by a closed boundary curve (KS). Thus the cross section is inhomogeneous, wherein a reinforced element (21) is located in one of the said section holes. FIG. 12 is only showing only one example of vast number of forms and contents of a cross section for a rotor blade according to the claimed invention. Another example (not shown) is provided with a curved symmetry line (Q) and four individual section holes each of which is separated by a straight wall of a thickness corresponding to approximately 2 percentage of the chord length, wherein walls are arranged at right angles to (Q) and one reinforced I-beam element is arranged in two of said four section holes. In yet another example (not shown) the cross section is homogeneous, that is without section holes and reinforced elements.

Figure 13:
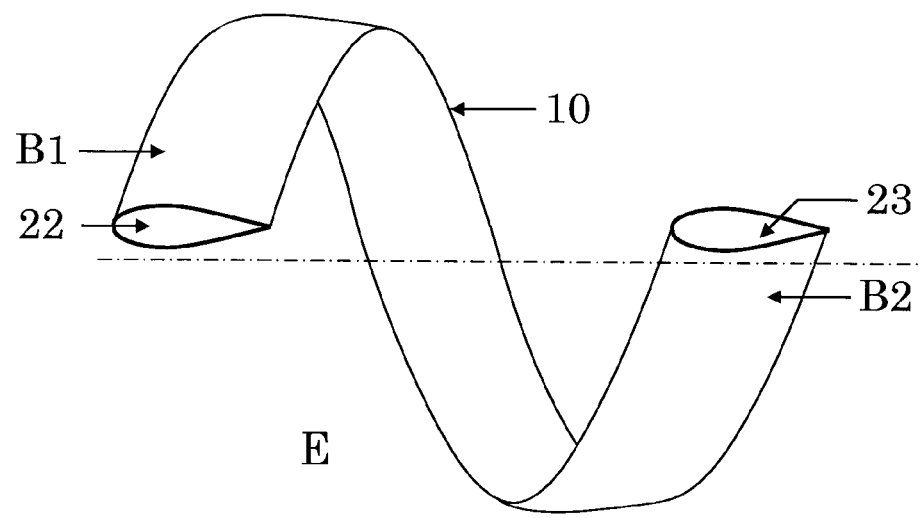
FIG. 13 View in perspective of a rotor blade with a wall in each end.

FIG. 13 shows in perspective a rotor blade (10) exhibiting two end sections (B1, B2) each of which provided with a wall end (22, 23), so the rotor blade is forming a closed body between said wall ends that is completely non-penetrated and closed to the surrounding environment (E). Another example (not shown) is exhibiting one end section (B1) and a middle section (B2), arranged in such a way that the wall ends located in the end (22) and in the middle (23) together form a partition in the closed body, for example in the middle of the rotor blade; wherein the surrounding environment (E) is in contact with (23) via the section holes of that half of the rotor blade which does not include the wall end (22), that is one half of the rotor blade is closed while the other half is open to the surrounding environment.

What is claimed is:

1. A turbine adapted to production of useful energy from the motion of a streaming fluid and arranged at substantially right angles of an axis of turbine rotation to the current direction of the streaming fluid, comprising
   at least one turbine roller bearing comprising a rotatable bearing housing and a non-rotatable bearing housing, and exhibiting a centre point and a centre line passing through said centre point; and
   at least one hub arranged in fixed attachment to the rotatable bearing housing and to a supporting structure arranged in fixed attachment to the non-rotatable bearing housing; and
   a blade body located in whole or in part in the fluid and arranged in attachment to the hub, wherein the motion of the streaming fluid makes the blade body feasible to rotate around the axis of turbine rotation which coincides with the centre line passing through a point identical to said centre point, and comprising
   a plurality of rotor blades each of which extends continuously in the axial and radial direction of a helix exhibiting an axis coinciding with the axis of turbine rotation, and exhibits a handedness around the axis of turbine rotation and in a plane normal to the helix axis is provided with a cross section exhibiting a centre line normal to said cross section and a wing profile which is provided with two end sections, wherein a first end section is provided with a round nose oriented to coincide with a direction of rotation of the blade body and a second end section is provided with a taper oriented in a direction opposite to the direction of rotation of the blade body, wherein the turbine exhibits a first point of intersection between the axis of turbine rotation and a line normal to the axis of turbine rotation, and
   a plurality of blade joints each of which exhibits a second point of intersection (PB1) between the centre line of a first rotor blade and said line normal to the axis of turbine rotation and a third point of intersection (PB2) between the centre line of a second rotor blade and said line normal to the axis of turbine rotation, wherein each of points of intersection (PN, PB1, PB2) are joined by a joint line which is normal to the axis of turbine rotation and defines an end point (PN) at an intersection with the axis of turbine rotation (PN), wherein a distance PN-PB1 is not equal to a distance PN-PB2, wherein said first and second rotor blade exhibit different hands around the axis of turbine rotation and are attached to each other by at least one of said blade joints, and the blade body exhibits a diameter and a mid-point coinciding with the point of intersection between the axis of turbine rotation and the mid-normal plane, wherein said blade joints are attached to each other by intermediate parts consisting of said rotor blades.

2. The turbine according to claim 1, wherein a first blade joint exhibits the distance PN-PB1 which is larger than the distance PN-PB2 and a second blade joint exhibits the distance PN-PB1 which is smaller than the distance PN-PB2, wherein no blade joint is located between said first and second blade joint.

3. The turbine according to claim 1, wherein the first blade joint exhibits a first sum of the distances PN-PB1 and PN-PB2, and the second blade joint exhibits a second sum of the distances PN-PB1 and PN-PB2, wherein said first sum is equal to said second sum.

4. The turbine according to claim 1, wherein the blade joint comprises two blade caps each of which is provided with a cross section exhibiting a centre line parallel to the centre line of the rotor blade, wherein said cross section in whole or in part encloses the wing profile of the rotor blade.

5. The turbine according to claim 4, wherein the blade joint comprises a bar joint attaching two blade caps with one another in a blade joint and is provided with a bar provided with a cross section exhibiting a centre line, wherein said centre line coincides with the joint line.

6. The turbine according to claim 5, wherein the bar joint comprises at least one bar roller bearing exhibiting a centre line coinciding with the centre line of the bar, wherein said bar roller bearing makes reciprocal rotation of the centre lines of the rotor blades feasible around the joint line.

7. The turbine according to claim 1, wherein the rotor blades are manufactured of polyolefin selected from the group consisting of polyethylene, polypropylene, polystyrene, and polyvinyl chloride or of metal, or of a combination of two or more of said materials.

8. The turbine according to claim 7, wherein the rotor blades are produced in a manufacturing process by extrusion or co-extrusion.

9. The turbine according to claim 8, wherein the wing profile of the rotor blade is limited by a closed outline curve located in a plane normal to the centre line of the rotor blade and encloses an area provided with at least two section holes each of which is limited by a closed boundary curve, wherein said boundary curve is not exhibiting a point of intersection with said outline curve or any other boundary curve.

10. The turbine according to claim 9, wherein the rotor blade comprises at least one reinforced element provided with a cross section exhibiting a centre line, wherein said reinforced element is located in at least one of the section holes and said centre line of said reinforced element is parallel with the centre line of the rotor blade.

11. The turbine according to claim 9, wherein the rotor blade exhibits a first section provided with a first end wall and a second section provided with a second end wall, wherein the rotor blade and said end walls altogether constitute a body provided with a closed surface against the surrounding environment.

12. The turbine according to claim 4, wherein at least one blade cap or reinforced element is manufactured of composite materials made of fibres of glass, carbon or Kevlar included in a material made of synthetic polymer.

13. The turbine according to claim 7, wherein the metal is an aluminium.

14. The turbine according to claim 10, wherein at least one blade cap or reinforced element is manufactured of composite materials made of fibres of glass, carbon or Kevlar included in a material made of synthetic polymer.

* * * * *